US006848991B2

(12) United States Patent
Kusuda

(10) Patent No.: US 6,848,991 B2
(45) **Date of Patent: *Feb. 1, 2005**

(54) ONLINE GAME METHOD AND GAME SYSTEM

(75) Inventor: Kazuhiro Kusuda, Tokyo (JP)

(73) Assignee: Konami Corporation, Tokyo (JP)

( * ) Notice: Subject to any disclaimer, the term of this patent is extended or adjusted under 35 U.S.C. 154(b) by 22 days.

This patent is subject to a terminal disclaimer.

(21) Appl. No.: 09/785,981

(22) Filed: Feb. 20, 2001

(65) Prior Publication Data

US 2001/0016509 A1 Aug. 23, 2001

(30) Foreign Application Priority Data

Feb. 17, 2000 (JP) .................................... P2000-040228

(51) Int. Cl.[7] ................................................ A63F 13/00
(52) U.S. Cl. .............................................. 463/6; 700/92
(58) Field of Search ...................... 463/1–6, 16, 21–25, 463/27, 29, 40–42; 700/91–93

(56) References Cited

U.S. PATENT DOCUMENTS 4,494,197 A * 1/1985 Troy et al. .................... 463/18
4,569,026 A * 2/1986 Best ........................... 345/473
4,570,930 A * 2/1986 Matheson .................... 463/41
4,572,509 A * 2/1986 Sitrick ......................... 463/31
5,067,079 A * 11/1991 Smith et al. ................... 463/3
5,149,104 A * 9/1992 Edelstein ..................... 463/31
5,350,176 A * 9/1994 Hochstein et al. ............ 463/42
5,393,073 A * 2/1995 Best .............................. 463/1
5,411,258 A * 5/1995 Wilson et al. ................ 463/28
5,575,474 A * 11/1996 Rossides ...................... 463/26
5,971,855 A * 10/1999 Ng ............................... 463/42
6,060,895 A * 5/2000 Soh et al. ................... 324/760
6,080,063 A * 6/2000 Khosla ........................ 463/42
6,500,070 B1 * 12/2002 Tomizawa et al. ............ 463/43

FOREIGN PATENT DOCUMENTS

EP 0 864 341 A1 9/1998
JP 08-000829 1/1996
JP 10-216355 8/1998
WO WO 86/02753 A1 5/1986

* cited by examiner

*Primary Examiner*—John M. Hotaling, II
(74) *Attorney, Agent, or Firm*—Sughrue Mion, PLLC

(57) ABSTRACT

A plurality of horse racing game machines (1*a*, 1*b*, . . . 1*n*) and a control unit (2) for controlling game execution states of the horse racing game machines (1*a*, 1*b*, . . . 1*n*) are connected via a communication line (L). The control unit (2) provides the horse racing game machines for performing the race with part or the entirety of game-related data required for executing the game. The race is simultaneously held at the horse racing game machines (1*a*, 1*b*, . . . 1*n*). Execution states of the race and betting odds generated at all the horse racing game machines (1*a*, 1*b*, . . . 1*n*) are collected by the control unit (2). At the same time, the collected race execution states and integrated betting odds are presented in real time to the players surrounding all the horse racing game machines (1*a*, 1*b*, . . . 1*n*) using synthesized speech.

26 Claims, 8 Drawing Sheets

ONLINE GAME METHOD AND GAME SYSTEM

BACKGROUND OF THE INVENTION

1. Field of the Invention

The present invention relates to online game systems for connecting, for example, a plurality of horse racing game machines through a communication line, and for enabling players to play and enjoy a single horse racing game.

The present application is based on Japanese Patent Application No. 2000-040228, which is incorporated herein by reference.

2. Description of the Related Art

Concerning arcade game systems installed at game centers and the like, there are horse racing game machines simulating actual horse racing, cycle racing game machines simulating cycle racing, and track-and-field game machines simulating various track-and-field events and the like. In these types of arcade game machines, a ring-shaped racing field is formed on a board of a game machine, and a plurality of running models are caused to run on the field. The running models compete with one another in order of arrival, and a player wins if the player correctly predicts a set of finishing places. This type of arcade game machine is described in detail in, for example, Unexamined Japanese Patent Publication No. Hei. 10-57619 (competition game machine) and Unexamined Japanese Patent Publication No. Hei. 10-94675 (competition game machine).

Unlike consumer games targeted for general game computers, arcade game machines, which are played by a plurality of players who assemble and play a single game, are generally provided with game supplies and facilities which appeal to player's preferences, making every effort to attract the player's attention. However, these efforts are only concerned with a particular game machine and do not influence other game machines. In the case of a racing game in which odds are generated, the odds are computed based on betting contents in a game machine which performs that particular racing game. Integrated odds in which betting contents in other game machines are reflected are not computed.

Concerning large arcade game machines, installation of hardware is important. Software defining game contents is generally installed a few months after the hardware installation has been completed. It is therefore difficult to implement a game whose contents require real time features using an arcade game machine.

SUMMARY OF THE INVENTION

In view of the foregoing circumstances, it is an object of the present invention to provide an online game method capable of ensuring real time features using a hardware-oriented game machine, e.g., an arcade game machine, and to provide an online game system suitable for performing this method.

To achieve the above object, according to a first aspect of the present invention, there is provided an online game method which comprises connecting a plurality of game machines capable of performing a single betting-type racing game played by a plurality of players assembled in one place and a control unit for controlling game execution states of each of the game machines via a communication line. The online game method provides, by the control unit, part or the entirety of game-related data required for executing the racing game to the game machines for performing the race; thereafter simultaneously executes, by each of the game machines, the racing game based on the game-related data; collects, by the control unit, execution states of the race at the game machines and betting odds generated at all the game machines; and presents, in real time, the collected race execution states and integrated betting odds to the players surrounding all the game machines using at least one of visual information and auditory information.

The "visual information" includes information visible to players' eyes. Letters, images, projected images, and the like correspond to the visual information. The "auditory information" includes information audible to players' ears. For example, synthesized speech corresponds to the auditory information. The "game-related data" includes the names of races and data concerning the races, data on the names of participants in the races and characteristics of the participants, data concerning dividends, and data required for lending realism to the game. When each of the game machines includes a computer to implement various functions, a computer program can be included in the game-related data.

Further, to achieve the above object, according to a second aspect of the present invention, there is provided another online game method which comprises connecting a plurality of game machines capable of performing a single betting-type racing game played by a plurality of players assembled in one place and a control unit for controlling game execution states of each of the game machines via a communication line. The online game method provides, by the control unit, part or the entirety of game-related data required for executing the racing game to the game machines for performing the race; thereafter enables the game machines to execute the racing game based on the game-related data; collects, by the control unit, betting odds generated at all the game machines and execution states of the race at the game machines for performing the race; and presents, in real time, the race execution states and integrated betting odds to the players surrounding all the game machines using visual information and/or auditory information.

The game machines may cause the players to compete with one another in running abilities of running models whose running abilities are improved by the respective players. When the race is terminated, a game value in accordance with the betting odds may be paid off. The racing game may be a game simulating an actual race. In this case, whenever up-to-date information on the actual race is generated, the control unit may provide the game machines for performing the race with the information as part of the game-related data. Alternatively, the control unit may periodically provide the game machines with up-to-date information generated by an actual race as part of the game-related data.

At least one of the game machines may include an accepting device which accepts speech registration data desired by the players. When the game machine presents the race execution states using synthesized speech, the game machine may form and present synthesized speech which at least includes the speech registration data as part of the synthesized speech.

Further, to achieve the above object, according to a third aspect of the present invention, there is provided a game system which is an online game system for interconnecting a plurality of arcade-type game machines capable of performing a single betting-type racing game played by assembled players via a communication line. A control unit for performing game execution control of the game machines is connected to the communication line.

Each of the game machines includes an execution device which obtains part or the entirety of game-related data required for executing the racing game from the control unit, and which executes the racing game based on the obtained game-related data; a totaling device which totals betting odds for the race; a sender which sends the totaled betting odds and race execution states of the game machine to the control unit; and a receiver receiving, from the control unit, integrated race execution states, which are obtained by integrating the race execution states from the game machine and another game machine, and integrated betting odds, the receiver presenting the race execution states in real time to the player surrounding the game machine using visualized information and/or synthesized speech, and the receiver displaying the integrated betting odds and betting odds at the game machine.

In the game system of the present invention, it is possible to give a running commentary of the race using synthesized speech, based on data under the control of the control unit. Specifically, the control unit may include a syllabic phoneme data storing device which stores syllabic phoneme data including accent and intonation and a retrieval device which retrieves, from the syllabic phoneme data storing device, a combination of syllabic phoneme data corresponding to the integrated race information, and outputs the retrieved combination of the syllabic phoneme data to all the game machines. Each of the game machines may further include a speech synthesis device which produces synthesized speech based on the combination of syllabic phoneme data obtained from the control unit and a commentator which gives a running commentary of the racing game using the synthesized speech produced by the speech synthesis device. The "syllabic phoneme data" includes data in a minimum phonetic unit. For example, "Sun•day•si•len•ce" consists of five pieces of syllabic phoneme data.

The running commentary of the race may be given by the game machine. Specifically, at least one of the game machines may further include an accepting device which accepts speech registration data registered by the player playing the game machine; a syllabic phoneme data storing device which stores syllabic phoneme data including accent or intonation; a speech synthesis device which retrieves the accepted speech registration data and a combination of syllabic phoneme data, which correspond to the integrated race information obtained from the control unit, from the syllabic phoneme data storing device, and the speech synthesis device producing synthesized speech which at least includes the speech registration data as part of the synthesized speech; and a commentator which gives a running commentary of the racing game using the synthesized speech produced by the speech synthesis device.

The game machines may cause the players to compete with one another in running abilities of running models whose running abilities are improved by the respective players. When the race is terminated, it is preferable to pay off a game value in accordance with the betting odds in view of motivating the players to compete in the race. The game system may further include a ranking device which ranks race results of all the running models appearing in the racing game, and which periodically posts the ranking results on an electronic medium which can be read by the public.

DETAILED DESCRIPTION OF THE PREFERRED EMBODIMENTS

A preferred embodiment in which a game system of the present invention is applied to an online horse racing game is described below.

Figure 1:
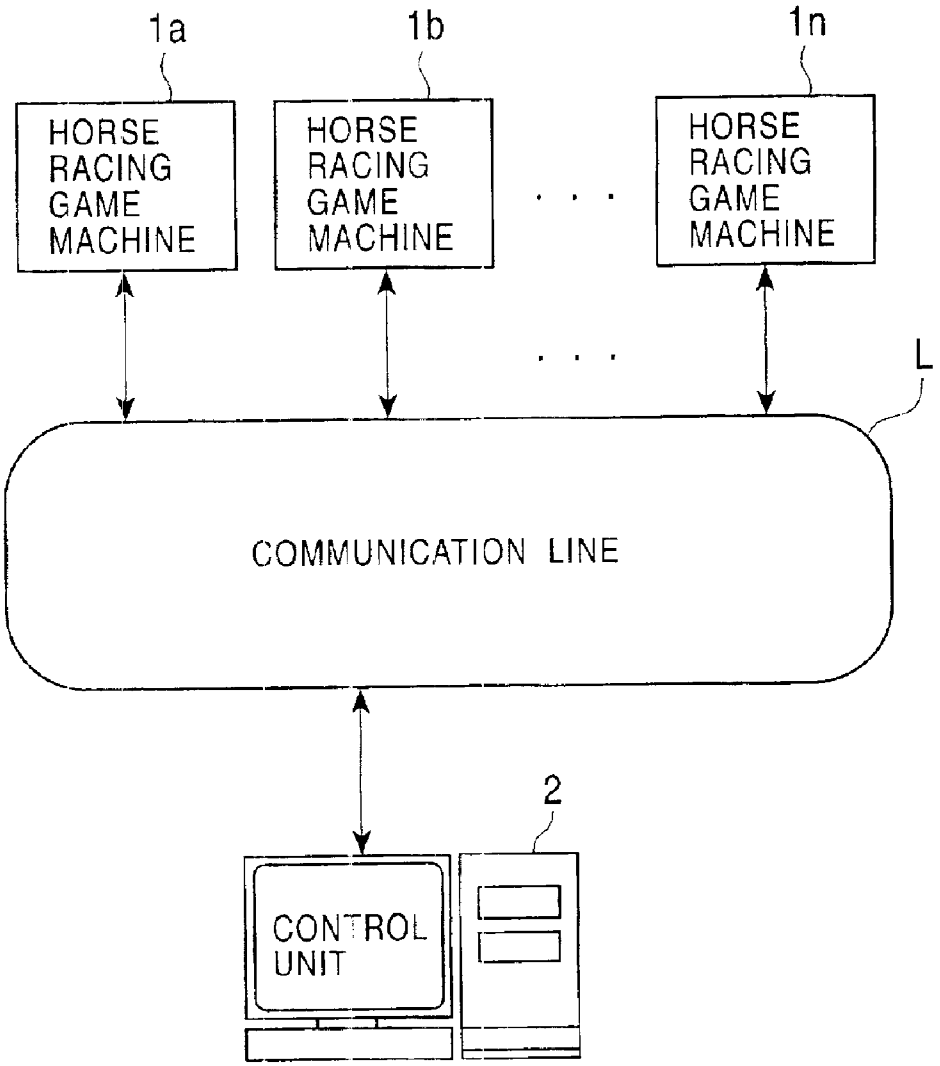
FIG. 1 is a block diagram of the entirety of a game system to which the present invention is applied.

FIG. 1 is a block diagram of a game system of the present embodiment. The game system includes horse racing game machines 1*a*, 1*b*, . . . 1*n* which are installed, respectively, in arcades and a control unit 2 for performing bidirectional communication through a communication line L such as a public network with the horse racing game machines 1*a*, 1*b*, . . . 1*n*.

Horse Racing Game Machine

The horse racing game machines 1*a*, 1*b*, . . . 1*n* each include a plurality of racehorses (not shown) which are running models, a casing for forming hardware for a horse racing game environment, and a game progress control device for controlling the progress of a horse racing game. Since the horse racing game machines 1*a*, 1*b*, . . . 1*n* are identical in construction, subfixes are omitted in the following description, and numeral 1 is assigned to one of the game machines.

The horse racing game machine 1 performs a single horse racing game played by a plurality of players who assembles in one place to play the game. A feature of the embodiment is that running abilities of a racehorse can be improved in accordance with player's intentions and operations, and the running abilities of the raised horse can be competed against those of other racehorses in a race. In a race, betting odds are displayed, and a running commentary of the course of the race is given using synthesized speech. It is therefore possible to make the player feel the atmosphere of an actual race.

A racehorse is a model including therein a control device for controlling a running mechanism. The internal control device is driven by a wireless signal from the game progress control device, thus enabling the racehorse to run.

Figure 2:
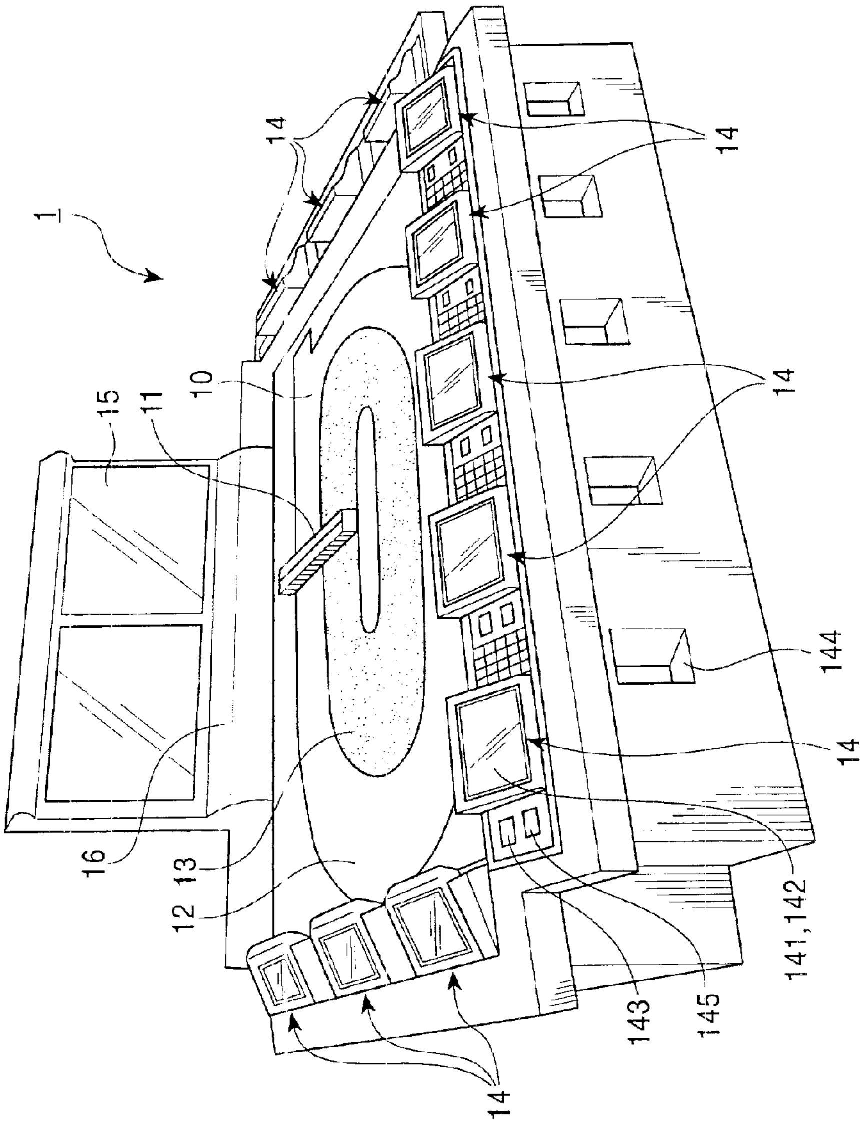
FIG. 2 is an external perspective view of a horse racing game machine of the present embodiment.

The casing of the horse racing game machine 1 has, for example, a structure shown in FIG. 2.

Specifically, the casing includes a racing field 10 provided substantially at the central part of a flat board, a plurality of stations 14 provided so as to surround the field 10, a board 15 for displaying odds, race results, and other guidance information, and a speaker system 16 for outputting synthesized speech such as race running commentaries and the like.

The field 10 is provided with two types of tracks 12 and 13, which include a starting gate 11. Specifically, the track 12 simulates a turf course (hereinafter referred to as a "turf track"), and the track 13 simulates a dirt course (hereinafter referred to as a "dirt track"). By running a plurality of racehorses on the tracks 12 and 13, races are held.

The turf track 12 and the dirt track 13 cause each of the racehorses to run in a manner in which the current ability parameters are reflected. At the same time, variable factors of the ability parameters, which differ in accordance with the running, are provided for each of the racehorses. In other words, the turn track 12 or the dirt track 13 is arbitrarily selected and the horse runs a race on the selected track. While enjoying the race based on the current running ability of the horse owned by the player, the player can improve a parameter for strengthening the body or a speed parameter or exert that parameter at an arbitrary time. It is expected that enjoyment will be substantially enhanced compared with the conventional type of game system. A passageway is formed between the tracks 12 and 13 so that racehorses can enter and exit. A single type of racehorse can participate in races held on two different types of track.

Concerning each of the stations 14, the player sits opposite the station 14 and operates the station 14. The station 14 includes a display 141 for displaying various screens changing in accordance with the progress of the horse racing game and a touch panel 142 provided on a display surface of the display 141. When the player touches a predetermined position on the screen displayed on the display 141 in accordance with instructions on the screen, the touch panel 142 detects the touched position. Hence, the corresponding data can be input to the game progress control device, which will be described below. The station 14 further includes a medal insertion slot 143 into which the player inserts medals, a medal ejection hole 144 from which medals are paid off in accordance with the game result, and a card insertion slot 145 into which a game card, having recorded therein racehorse raising information as occasion demands, is inserted.

The game progress control device of the horse racing game machine 1 is described next.

Figure 3:
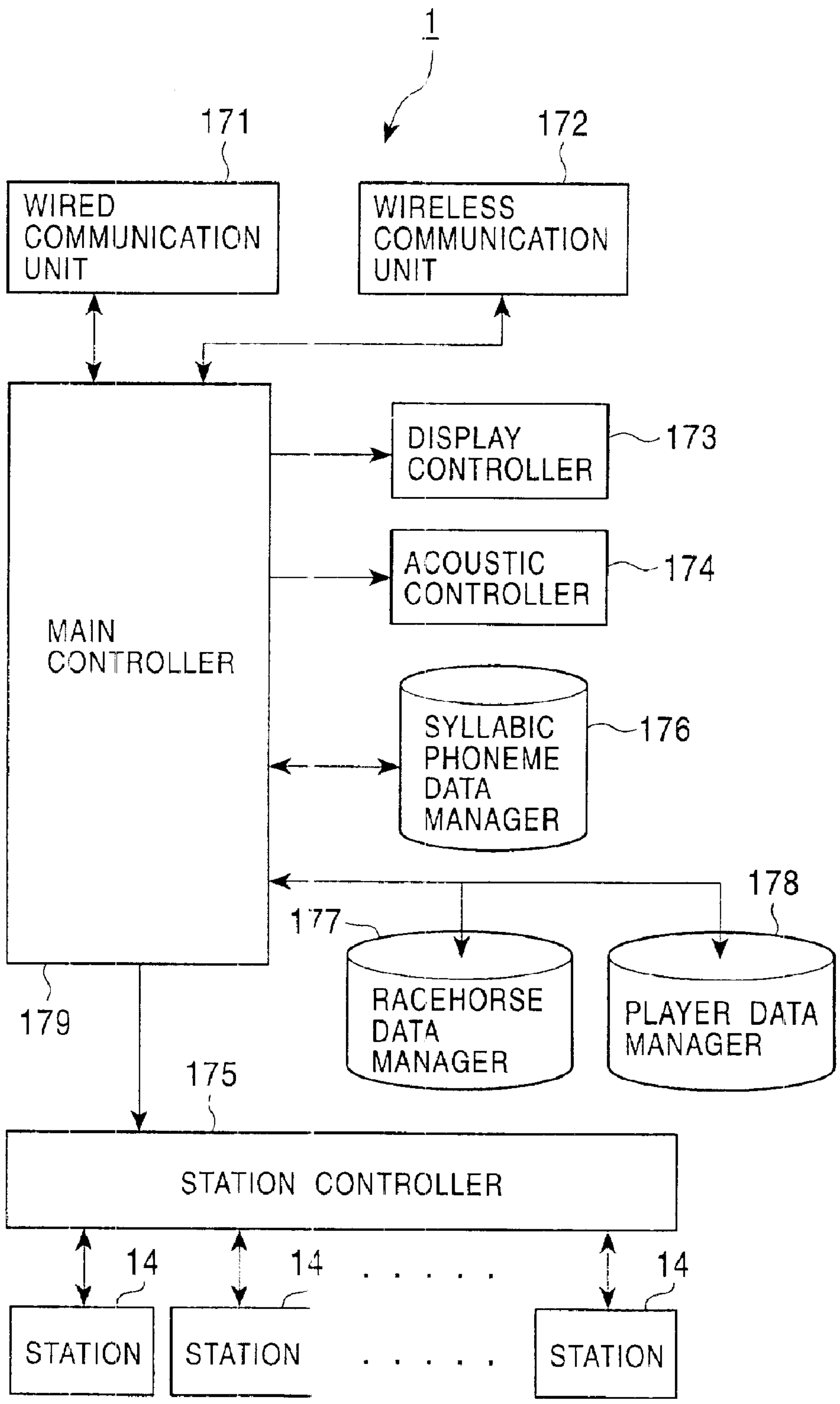
FIG. 3 is a functional block diagram of the horse racing game machine.

The game progress control device of the present embodiment includes, as shown in FIG. 3, a wired communication unit 171 for performing bidirectional communication with the control unit 2 through the communication line L, a wireless communication unit 172 for transmitting a control signal to the racehorse, and functional blocks implemented by a programmed computer. The functional blocks include a display controller 173, an acoustic controller 174, a station controller 175, a syllabic phoneme data manager 176, a racehorse data manager 177, a player data manager 178, and a main controller 179.

When monitoring and controlling the movement and the position of the racehorse in detail, the game progress control device further includes a camera capable of capturing an image of the entire field 10 and image processing device for performing pattern recognition of an image captured by the camera.

The display controller 173 controls the display of the board 15. The acoustic controller 174 controls the output of sound data to the speaker system 16. The station controller 175 separately controls the operation of each of the stations 14. The syllabic phoneme data manager 176 manages syllabic phoneme data in a predetermined order. For each sound, a variety of combinations is prepared.

The racehorse data manager 177 manages information concerning racehorses appearing in the course of the game, stables, jockeys, and the like. The player data manager 178 is a type of database system for storing player data inherent to the player while linking the player data with a player ID (identification data).

The "player data" includes raising information for each player, including conditions under which a racehorse was raised and setting information (parameter setting for raising racehorses and the like) required for the game progressing.

While controlling the foregoing units 171 and 172 and the controllers 173, 174, and 175, the main controller 179 performs overall information management concerning horse racing game progress and forms functions. Specifically, the main controller 179 implements the following functions.

(1) Function of controlling operation of mechanical portion for race

This function prepares for a race, and when everything is ready, the function controls the starting gate 11 and causes each racehorse to run. The movement of each racehorse is sequentially controlled, and the position of each racehorse is detected. After the race is terminated, the order of arrival is determined. The function generates information indicating the series of race execution states.

(2) Function of totaling betting odds

This function totals betting odds for each race at the horse racing game machine 1. The betting odds are displayed on the display 141 of the station 14 and on the board 15. When integrated betting odds are transmitted from the control unit 2, the integrated betting odds are displayed on the board 15 or the like.

(3) Function of cooperating with the control unit 2

This function sends the betting odds and race execution states of the horse racing game machine 1 to the control unit 2 and receives the integrated race execution states and the integrated betting odds from the control unit 2. Concerning the race execution states, the function converts the states into synthesized speech and outputs the speech in real time from the speaker system 16. Concerning the integrated betting odds, the function displays the integrated betting odds and the betting odds at the horse racing game machine 1 on the board 15 or on the display 141 of the station 14.

The race execution states can be displayed on the board 15 along with synthesized speech or instead of using synthesized speech. If the player desires, speech registration data is accepted, and synthesized speech in which the speech registration data is reflected is formed when giving a running commentary of a race using the synthesized speech.

In order to facilitate the production or formation of synthesized speech, data concerning speech is managed using syllabic phoneme data which is a minimum phonetic unit. Concerning conventional techniques for giving running commentaries which can be applied to this type of game, these techniques cannot produce synthesized speech other than those produced using pre-recorded speech segments. In contrast, when the data is managed using syllabic phoneme data, a wider variety of synthesized speech can be produced. It is therefore possible to achieve a mode which is suitable for giving a running commentary.

Specifically, the number of racehorses' names can be flexibly updated or increased, and it is possible to change only part of the data. As described above, the syllabic phoneme data is managed in a manner in which accent and intonation are taken into consideration.

(4) Function of raising and controlling racehorse

To each racehorse, inherent ability parameters are assigned in advance. The running ability changes in accordance with the ability parameters.

The ability parameters include a group of multi-dimensional parameters including functional parameters, such as a stamina parameter and a speed parameter, and parameters (numeric values) indicating arbitrary characteristics, such as weight, running ability, temperament, and the like. Each of these parameters changes in accordance with a given environment. Concerning variable factors, there is a running environment or the like. Although a player raises a racehorse selected by the player, the player is initially not aware of how the racehorse will mature. While subjecting the racehorse to various environments, the player enjoys the growth process in accordance with the variable ability parameters. This function performs the overall management of the ability parameters.

Control Unit

The control unit 2 of the present embodiment is implemented by a computer (or computer system) having a communication function.

Figure 4:
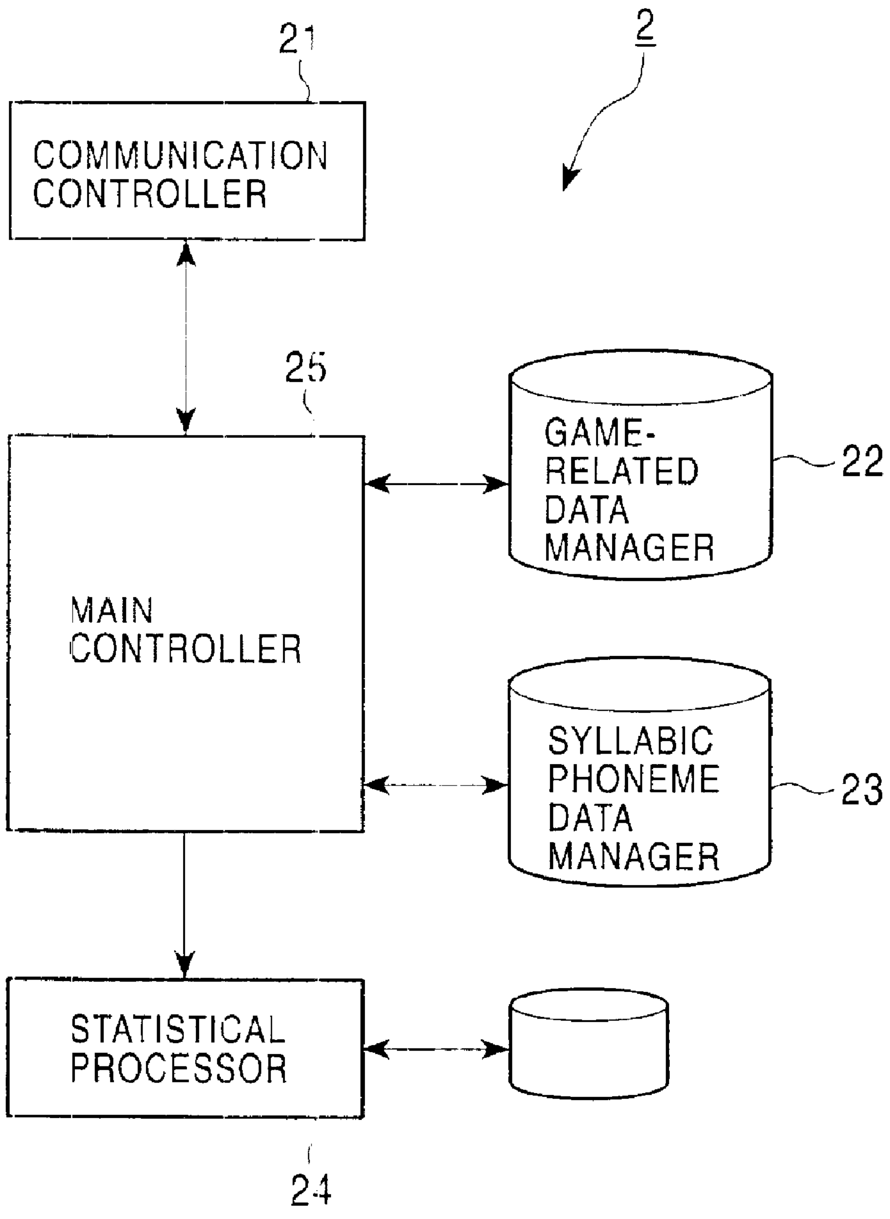
FIG. 4 is a block diagram of a control unit of the present embodiment.

The functional structure of the control unit 2 is shown in FIG. 4.

Specifically, the control unit 2 includes various functional blocks formed by the computer reading and executing a computer program recorded in a predetermined recording medium. The functional blocks include a communication controller 21 for establishing a connection with the communication line L; a game-related data manager 22 for managing game-related data to be provided to each horse racing game machine 1 while updating the data as occasion demands; a syllabic phoneme data manager 23 for outputting combinations of syllabic phoneme data so as to enable all the game machines 1 to present game execution states, which can be played by the game machines 1 and are common among the game machines 1, using synthesized speech; a statistical processor 24 for taking statistics of race results according to each racehorse and determining the ranking or the like for a predetermined period of time; and a main controller 25 for performing the overall control other than those mentioned.

The operations of these functional blocks will be described in the following portion on the operation.

Operation

An online game method using the above-configured game system is described.

Figure 5:
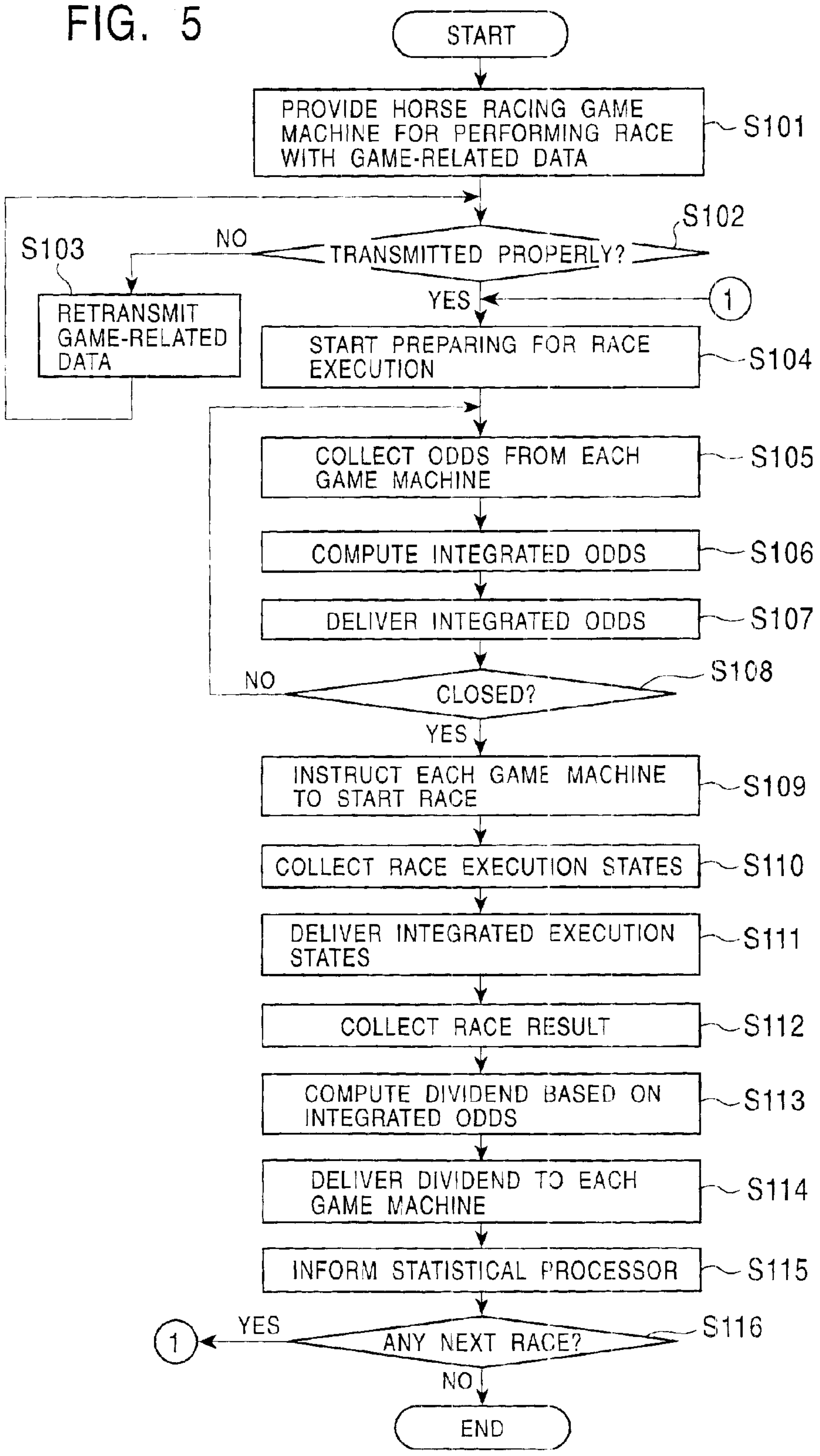
FIG. 5 is a chart of a process performed by the control unit of the present embodiment.
Figure 6:
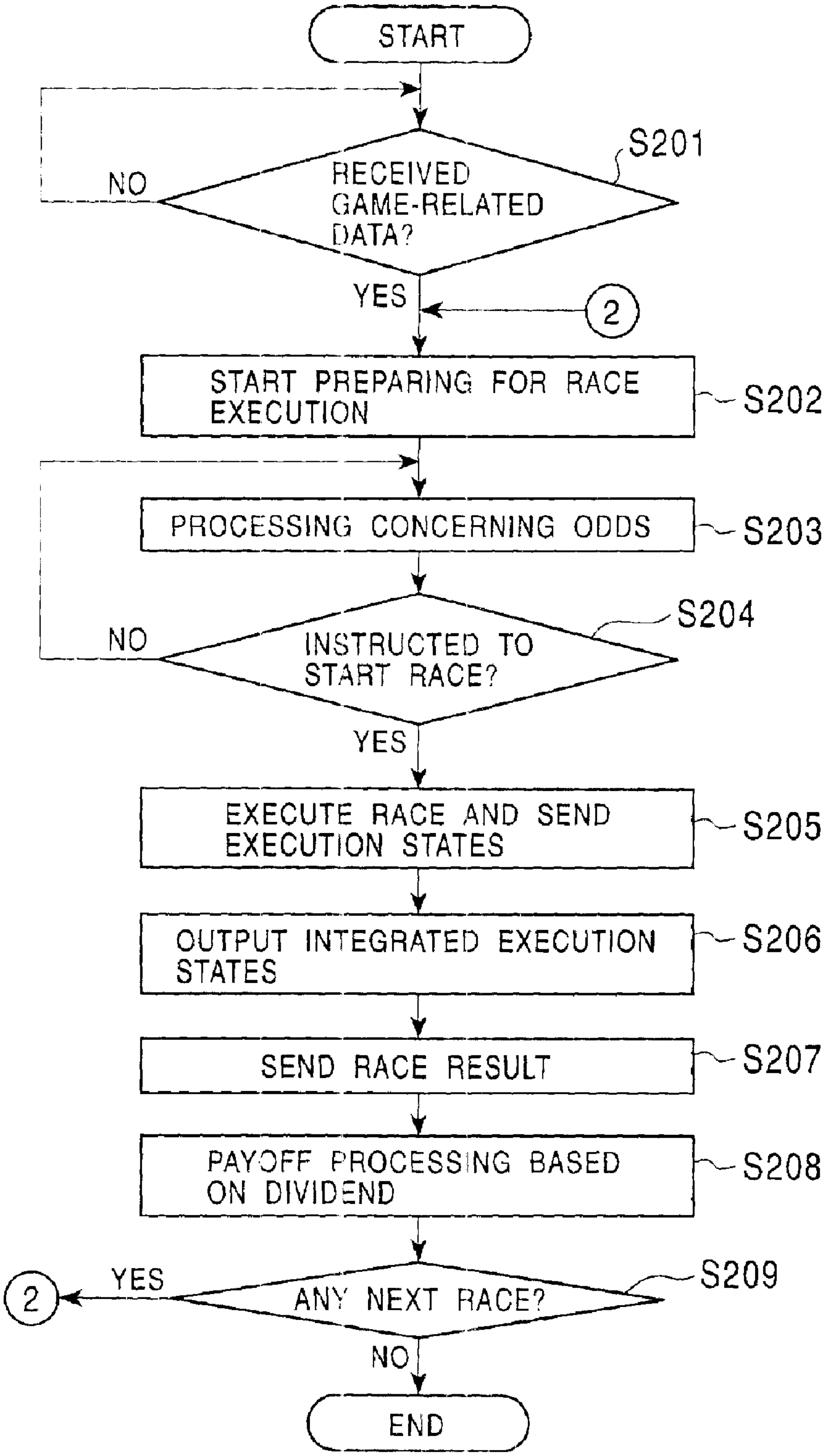
FIG. 6 is a chart of a process performed by the horse racing game machine of the present embodiment.
Figure 7:
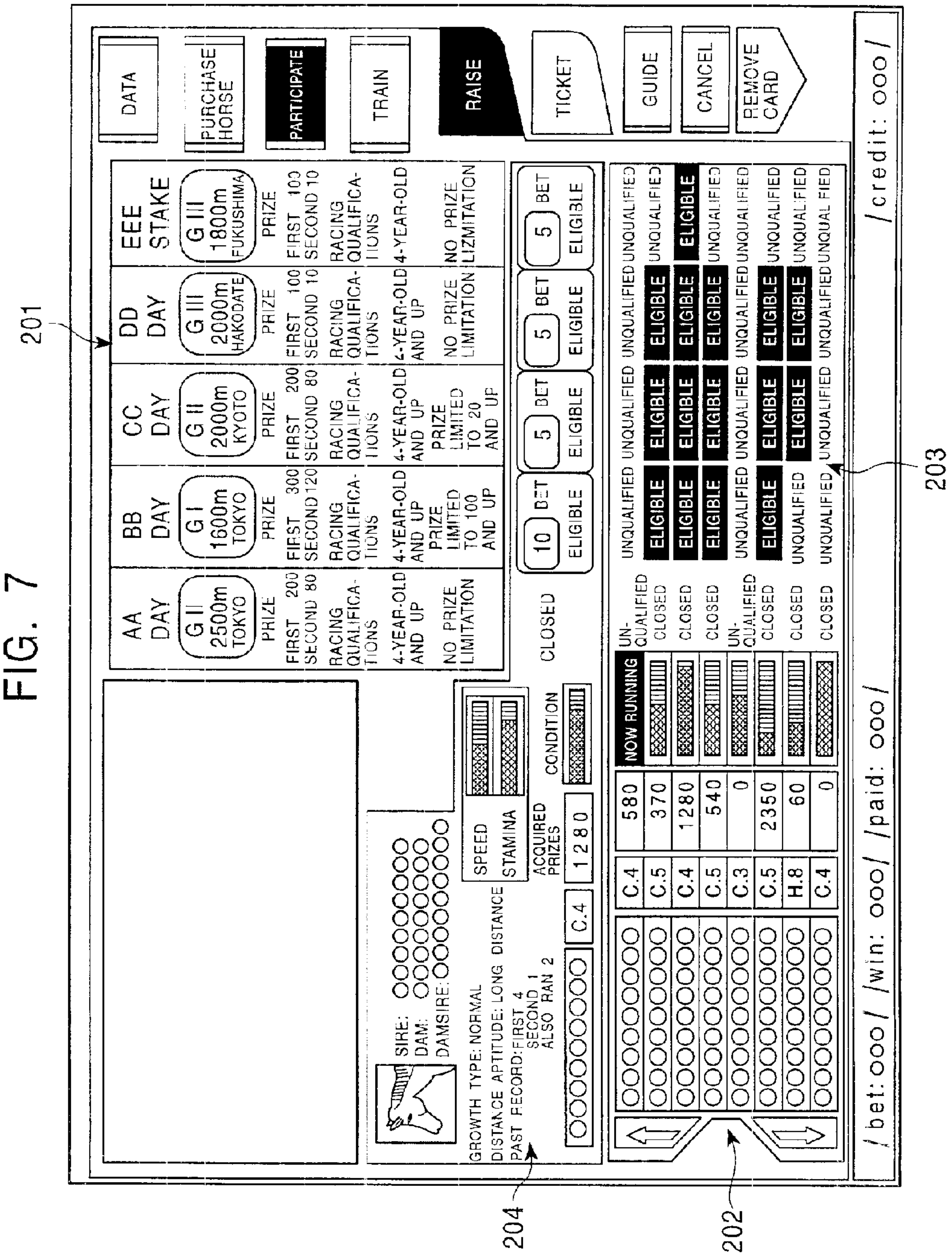
FIG. 7 illustrates an example of a race selection screen among screens displayed according to the present embodiment.
Figure 8:
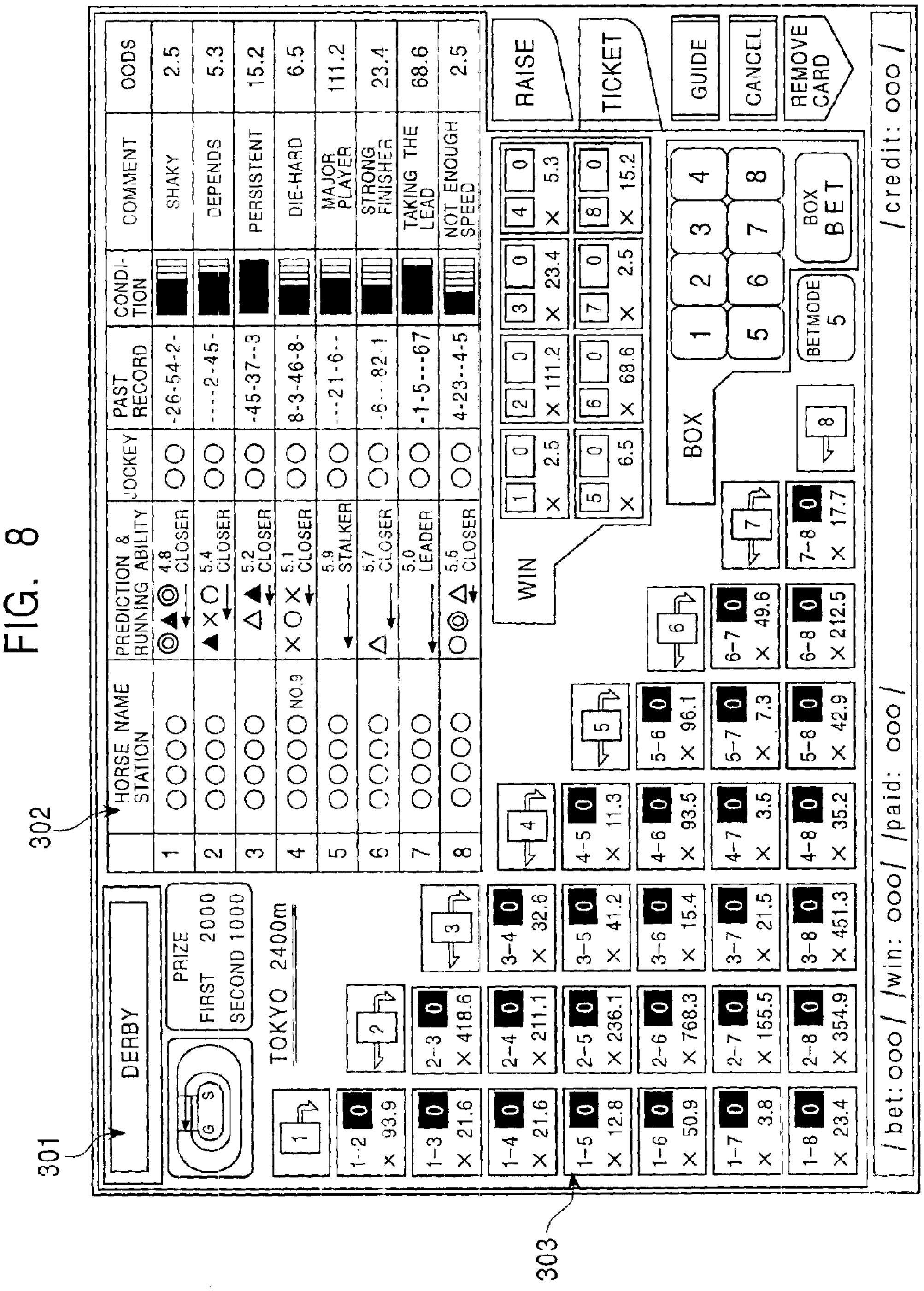
FIG. 8 illustrates an example of a betting screen among the screens displayed according to the present embodiment.

FIG. 5 is a chart of an overall process performed by the control unit 2 to perform the online game method. FIG. 6 is a chart of an overall process performed by the horse racing game machine 1. FIGS. 7 and 8 illustrate examples of displays which are displayed on the display 141 of the station 14.

Referring to FIG. 5, the control unit 2 (main controller 25) provides all the horse racing game machines 1 with the game-related data, which is under the management of the game-related data manager 22, via the communication controller 21 and the communication line L (step S101). In the present embodiment, the game-related data includes information such as the names of actual horse races and information concerning the actual races, the names of racehorses appearing in the actual races and information concerning the racehorses, prizes, running conditions, and the like. It is preferable that the names of racehorses be made different for each horse racing game machine. When the name of a particular racehorse is set in the horse racing game machine 1, only additional data is provided. When the game-related data is not properly provided, the game-related data is retransmitted (step S102: No and step S103).

Concerning the information on the actual horse races, whenever up-to-date data is generated, it is possible to provide all the horse racing game machines 1 with the data as part of the game-related data. Alternatively, it is possible to provide the data at fixed intervals. In the latter case, for example, it is possible to implement an operation in which special races are held on weekends.

When the game-related data is properly provided, the main controller 25 starts preparing to execute a race (step S104). The main controller 25 collects betting odds generated at each of the horse racing game machines 1, computes integrated odds which is common among all the horse racing game machines 1, and delivers the integrated odds to each of the horse racing game machines 1 (steps S105, S106, and S107). This processing is repeated until closing time (step S108: No).

After the closing time, the main controller 25 simultaneously instructs all the horse racing game machines 1 participating in the race to start the race (step S109). In the horse racing game machines 1, the racehorses start running at the same time. Subsequently, the race execution states are collected from the horse racing game machines 1, and information indicating the integrated execution states is generated, which in turn is delivered to all the horse racing game machines 1 (steps S110 and S111).

The race can be performed using a specific horse racing game machine or using a plurality of horse racing game machines. Even in the latter case, a player can make a bet at all the horse racing game machines.

When the race is terminated, the results of the race are collected, and a dividend based on the integrated odds is computed, which in turn is delivered to all the horse racing game machines 1 (steps S112 to S114). The record of each racehorse is sent to the statistical processor 24, and the statistical processor 24 takes statistics of the record (step S115). When a next race is to be held, the processing returns to step S104.

Referring to FIG. 6, each of the horse racing game machines 1 receives the game-related data from the control unit 2 which performs the foregoing processing and starts preparing to execute a race (steps S201: Yes and step S202). Specifically, each of the stations 14 displays screens shown in FIGS. 7 and 8. FIG. 7 is a race selection screen for enabling a player to select a race in which the player wants a specific racehorse, i.e., a player's racehorse, to participate. The names of races are displayed in a region 201 at the upper right-hand side of the race selection screen. In this example, information such as a prize and racing qualifications for each race, which are included in the game-related data, are displayed. A list of racehorses already owned by the player is displayed in a region 202 at the lower side of the race selection screen. In this drawing, eight horses owned by the player are displayed. For each horse, sex (male or female), age, acquired prizes, and condition are displayed, and the player can easily read general information on each horse.

A region 203 on the right of the region 202 displays, according to each of the races displayed in the region 201, messages such as "eligible" indicating that the corresponding horse can participate in that race, "unqualified" indicating that the corresponding horse does not satisfy the racing qualifications, and "closed" indicating that the registration for that race has already been closed. In this way, the player can easily understand whether each horse is eligible for a particular race. Detailed information on the currently-selected horse is displayed in a region 204 above the region 202. In this example, the appearance of the horse, dam's name, sire's name, damsire's name, growth type, distance aptitude, past record, speed parameter, and stamina parameter are displayed. Between the regions 201 and 203, messages indicating whether the currently-selected horse displayed in the region 204 is eligible for a particular race are displayed based on the messages displayed in the region 203.

Concerning a race for which the horse is eligible, the number to be paid in a bet by the player is displayed. For example, in FIG. 7, the race on the farthest left has already been closed, and hence the horse cannot be registered for that race. Concerning the race at second from the left, the horse can be registered for that race by paying a bet of 10. Concerning the remaining races, the horse can be registered for the respective races by paying a bet of 5.

When the desired race name and the racehorse are determined on the race selection screen, a betting screen for enabling the player to make a bet (purchase a ticket) on the racehorse or on another racehorse is displayed. FIG. 8 illustrates an example of the betting screen.

In a region 301 at the upper left-hand side of the betting screen, the name of a race, prizes, a place where that race is held, and a racing distance are displayed. At the upper right-hand side of the betting screen, a region 302 is provided displaying information such as the names of horses running the race, jockeys, and the like. At the lower side of the betting screen, a region 303 is provided displaying odds on each ticket. The region 303 displays odds on various types of tickets including quinella, win, box, and the like. These odds vary every time the player purchases a ticket. On all such occasions, the horse racing game machine 1 sends the odds to the control unit 2 and receives the integrated odds from the control unit 2.

In the present embodiment, the betting screen shown in FIG. 8 only displays the odds generated at the horse racing game machine 1. Concerning the integrated odds transmitted from the control unit 2, the board 15 (see FIG. 2) displays the integrated odds.

The foregoing processing concerning the betting odds is repetitively performed until the control unit 2 gives a race starting instruction (step S203 and step S204: No).

In response to the race starting instruction, the race is executed, and execution states are sent to the control unit 2 (step S205). When integrated race states are received from the control unit 2, the integrated race states are output using synthesized speech (step S206). In other words, a running commentary of the race is given. On this occasion, a voice message is generated based on combinations of syllabic phoneme data in segment units which are prepared in advance. For example, the message "XX takes the lead, followed by XX, and XX is stalking on the outside" is generated. In the "XX" portions, the names of racehorses running the race are inserted. Along with the synthesized speech, the board 15 may display conditions of the racehorses running the race at all the horse racing game machines 1.

When speech registration data from the player is accepted, and when giving a running commentary of the race using synthesized speech, the synthesized speech in which the speech registration data is reflected is produced. For example, the player "AAA" causes a racehorse named "XXX Brian" to run the race. In this case, the "AAA Brian" is generated so that the name of the racehorse can be called out. In the present embodiment, the data used for speech synthesis is managed using syllabic phoneme data. It is therefore very simple to perform such processing.

After the race is terminated, the race result is sent to the control unit 2 (step S207). A dividend result is received from the control unit 2, and a game value based on these results is paid off (step S208). When a next race is to be held, the processing returns to step S202, and similar processing is performed.

According to the present embodiment, it is possible to implement a game system by interconnecting numerous horse racing game machines via a communication line, and hence betting odds can be changed dynamically. Furthermore, it is possible to understand states of a race executed at another horse racing game machine.

Hitherto, even when a small number of players participate in a betting-type racing game, odds fluctuate greatly. Thus, such a betting-type racing game is not applied to an arcade-type horse racing game machine. With the arrangement as in the present embodiment, a large number of players can participate in betting, and a game system using realistic odds fluctuations is implemented.

With the arrangement as in the present embodiment, it is possible to hold an event in which each of a plurality of players at different arcades has his own racehorses, which he raised, so as to run a single race to compete with one another.

Even when there is only one player, the player can still play the game. Thus, the game is very appealing to the player. In other words, the player can cause a player's racehorse to run while listening to a running commentary of a race held at a horse racing game machine at another arcade. In doing so, the player can virtually compete against other racehorses in the race. This contributes to an increased rate of use of this type of game system.

It is possible to rank racehorses and players who played major roles at arcades throughout the nation. Using the game system of the present embodiment, it is possible to hold an event in which the ranking is posted on the Internet or the like.

Making the best use of the fact that a plurality of horse racing game machines is interconnected via a communication line, the control unit 2 can afford services such as provision of game win information, racehorse raising information, and various advertising information.

Although the case in which the field 10 of the horse racing game machine 1 is mechanically constructed is described in the present embodiment, the present invention can be applied to a case in which the horse racing game machine 1 is formed using an electronic device.

For example, the field 10 can be formed by image processing using holography. Since the field 10 is electronically formed, characteristics such as the depth of the turf in the turf track 12 and soil viscosity in the dirt track 13 can be arbitrarily adjusted. This is expected to further enhance the enjoyment of the game.

The present invention is applicable not only to horse racing games, but also to other betting-type racing games such as cycle racing games and boat racing games.

As is obvious from the foregoing description, according to the present invention, there is an advantage in that it is possible to perform a racing game in which real time features are ensured using a hardware-oriented game machine, such as an arcade game machine.

What is claimed is:

1. An online game method comprising the steps of:

connecting a plurality of game machines, each machine being capable of executing the same game program for a single betting-type racing game played by a plurality of players assembled in one place and a control unit for controlling game execution states of each of the game machines via a communication line;

providing, by the control unit, part or the entirety of game-related data required for executing the racing game to each of the game machines for performing the race at each game machine;

after the providing step, simultaneously executing, by each of the game machines, the racing game based on the game-related data;

collecting, by the control unit, execution states of the of game program being executed for the race at each of the game machines and betting odds generated at each of the game machines; and presenting, in real time, (1) the collected race execution states from all game machines and (2) the integrated betting odds from all game machines to the players surrounding all the game machines using at least one of visual information and auditory information.

2. The online game method of claim 1, wherein the game machines for performing the race cause the players to compete with one another in running abilities of running models whose running abilities are improved by the respective players, and wherein when the race is terminated, a game value in accordance with the betting odds is paid off.

3. The online game method of claim 1, wherein the racing game is a game simulating an actual race, and wherein whenever up-to-date information on the actual race is generated, the control unit provides the game machines for performing the race with the information as part of the game-related data.

4. The online game method of claim 1, wherein the control unit periodically provides the game machines for performing the race with up-to-date information generated by an actual race as part of the game-related data.

5. The online game method of claim 1, wherein at least one of the game machines comprises an accepting device which accepts speech registration data desired by the players, and wherein when the game machine presents the race execution states using synthesized speech, the game machine forms and presents synthesized speech which at least includes the speech registration data as part of the synthesized speech.

6. The online game method of claim 1, further comprising receiving by the control unit predetermined characteristics of the players running model.

7. The online game method of claim 1, further comprising controlling by said control unit each of the plurality of game machines so as to synchronize the start of race games respectively executed by the plurality of game machines.

8. The online game method of claim 1, further comprising computing by said control unit integrated odds which are common among all of the plurality of game machines based on betting odds inputted by each player at each of the plurality of game machines.

9. The online game method of claim 1, wherein the races executed by the plurality of game machines are independent of each other.

10. The online game method of claim 1, further comprising collecting by said control unit executing states of the races and presenting the collected race execution states to the players surrounding all the game machines using at least one of visual information and auditory information in real time.

11. An online game method comprising the steps of:

connecting a plurality of game machines capable of performing a single betting-type racing game played by a plurality of players assembled in one place and a control unit for controlling game execution states of each of the game machines via a communication line;

providing, by the control unit, part or the entirety of game-related data required for executing the racing game to the game machines for performing the race;

after the providing step, enabling the game machines to execute the racing game based on the game-related data;

collecting, by the control unit, betting odds generated at all the game machines and execution states of the race at the game machines for performing the race; and presenting, in real time, the race execution states and integrated betting odds to the players surrounding all the game machines using at least one of visual information and auditory information.

12. The online game method of claim 11, wherein the game machines for performing the race cause the players to compete with one another in running abilities of running models whose running abilities are improved by the respective players, and wherein when the race is terminated, a game value in accordance with the betting odds is paid off.

13. The online game method of claim 11, wherein the racing game is a game simulating an actual race, and wherein whenever up-to-date information on the actual race is generated, the control unit provides the game machines for performing the race with the information as part of the game-related data.

14. The online game method of claim 11, wherein the control unit periodically provides the game machines for performing the race with up-to-date information generated by an actual race as part of the game-related data.

15. The online game method of claim 11, wherein at least one of the game machines comprises an accepting device which accepts speech registration data desired by the players, and wherein when the game machine presents the race execution states using synthesized speech, the game machine forms and presents synthesized speech which at least includes the speech registration data as part of the synthesized speech.

16. A game system, comprising:

a plurality of game machines capable of performing a single betting-type racing game played by a plurality of players assembled in one place, the plurality of game machines being connected via a communication line; and a control unit which performs game execution control of the game machines connected to the communication line, wherein each of the game machines comprises:

an execution device which obtains part or the entirety of game-related data required for executing the racing game from the control unit, and which executes the racing game based on the obtained game-related data;

a totaling device which totals betting odds for the race;

a sender which sends the totaled betting odds and race execution states of the game machine to the control unit; and a receiver receiving, from the control unit, integrated race execution states, which are obtained by integrating the race execution states from the game machine and another game machine, and integrated betting odds, the receiver presenting the race execution states in real time to the player surrounding the game machine using at least one of visual information and auditory information, and the receiver displaying the integrated betting odds and betting odds at the game machine.

17. The game system of claim 16, wherein the control unit comprises:

a syllabic phoneme data storing device which stores syllabic phoneme data including accent and intonation; and a retrieval device which retrieves, from the syllabic phoneme data storing device, a combination of syllabic phoneme data corresponding to the integrated race information, and which outputs the retrieved combination of the syllabic phoneme data to all the game machines, and wherein each of the game machines further comprises:

a speech synthesis device which produces synthesized speech based on the combination of syllabic phoneme data obtained from the control unit; and a commentator which gives a running commentary of the racing game using the synthesized speech produced by the speech synthesis device.

18. The game system of claim 16, wherein at least one of the game machines further comprises:

an accepting device which accepts speech registration data registered by the player playing the game machine;

a syllabic phoneme data storing device which stores syllabic phoneme data including accent or intonation;

a speech synthesis device which retrieves the accepted speech registration data and a combination of syllabic phoneme data, which correspond to the integrated race information obtained from the control unit, from the syllabic phoneme data storing device, and the speech synthesis device producing synthesized speech which at least includes the registration data as part of the synthesized speech; and a commentator which gives a running commentary of the racing game using the synthesized speech produced by the speech synthesis device.

19. The game system of claim 16, wherein the game machines cause the players to compete with one another in running abilities of running models whose running abilities are improved by the respective players, and wherein when the race is terminated, a game value in accordance with the betting odds is paid off.

20. The game system of claim 19, further comprising a ranking device which ranks race results of all the running models appearing in the racing game, and which periodically posts the ranking results on an electronic medium which can be read by the public.

21. The game system of claim 16, wherein the game machines are arcade-type horse racing game machines which partially include information generated by an actual horse race.

22. The game system of claim 16, wherein said game machine further comprising means for a player to specify predetermined characteristics of the players running model.

23. The game system of claim 16, wherein said control unit is operative to control each of the plurality of game machines so as to synchronize the start of race games respectively executed by the plurality of game machines.

24. The game system of claim 16, wherein said control unit is operative to compute unit integrated odds which are common among all of the plurality of game machines based on betting odds inputted by each player at each of the plurality of game machines.

25. The game system of claim 16, wherein the races executed by the plurality of game machines are independent of each other.

26. The game system of claim 16, wherein said control unit is operative to collect executing states of the races and present the collected race execution states to the players surrounding all the game machines using at least one of visual information and auditory information in real time.

* * * * *